(12) United States Patent
Cheng

(10) Patent No.: US 11,966,217 B2
(45) Date of Patent: Apr. 23, 2024

(54) FAULTY VARIABLE IDENTIFICATION TECHNIQUE FOR DATA-DRIVEN FAULT DETECTION WITHIN A PROCESS PLANT

(71) Applicant: EMERSON PROCESS MANAGEMENT POWER & WATER SOLUTIONS, INC., Pittsburgh, PA (US)

(72) Inventor: Xu Cheng, Pittsburgh, PA (US)

(73) Assignee: EMERSON PROCESS MANAGEMENT POWER & WATER SOLUTIONS, INC., Pittsburgh, PA (US)

(*) Notice: Subject to any disclaimer, the term of this patent is extended or adjusted under 35 U.S.C. 154(b) by 431 days.

(21) Appl. No.: 17/132,687

(22) Filed: Dec. 23, 2020

(65) Prior Publication Data

US 2022/0197260 A1  Jun. 23, 2022

(51) Int. Cl.
| | |
|---|---|
| G05B 19/41 | (2006.01) |
| G05B 19/418 | (2006.01) |
| G05B 23/02 | (2006.01) |
| G06F 18/214 | (2023.01) |
| G06T 7/00 | (2017.01) |

(52) U.S. Cl.
CPC ..... *G05B 23/0235* (2013.01); *G05B 19/4183* (2013.01); *G05B 19/41875* (2013.01); *G06F 18/214* (2023.01); *G06T 7/0004* (2013.01); *G05B 19/4184* (2013.01); *G05B 23/0221* (2013.01); *G05B 23/0262* (2013.01); *G05B 2219/24065* (2013.01); *G05B 2219/31356* (2013.01); *G05B 2219/32222* (2013.01); *G05B 2219/32224* (2013.01)

(58) Field of Classification Search
CPC ... G01F 9/00; G05B 23/0254; G05B 23/0235; G05B 2219/32222; A61B 5/291; G01D 3/08; G06F 18/214
See application file for complete search history.

(56) References Cited

U.S. PATENT DOCUMENTS

| | | | |
|---|---|---|---|
| 4,937,763 | A | 6/1990 | Mott |
| 5,764,509 | A | 6/1998 | Gross et al. |
| 6,609,036 | B1 | 8/2003 | Bickford |
| 2004/0002776 | A1 | 1/2004 | Bickford |

(Continued)

OTHER PUBLICATIONS

Ustinova et al., RU 2641447, (translation), Jan. 17, 2018, 12 pgs <RU_2641447.pdf>.*

(Continued)

*Primary Examiner* — Tuan A Vu
(74) *Attorney, Agent, or Firm* — MARSHALL, GERSTEIN & BORUN LLP

(57) ABSTRACT

A real-time control system includes a faulty variable identification technique to implement a data-driven fault detection function that provides an operator with information that enables a higher level of situational awareness of the current and likely future operating conditions of the process plant. The faulty variable identification technique enables an operator to recognize when a process plant component is behaving abnormally to potentially take action, in a current time step, to alleviate the underlying cause of the problem, thus reducing the likelihood of or preventing a stall of the process control system or a failure of the process plant component.

20 Claims, 8 Drawing Sheets

(56) References Cited

U.S. PATENT DOCUMENTS

| | | | |
|---|---|---|---|
| 2008/0208072 A1* | 8/2008 | Fadem | A61B 5/291 600/544 |
| 2015/0177030 A1* | 6/2015 | Vilim | G01D 3/08 702/183 |
| 2018/0348013 A1* | 12/2018 | Farahmand | G01F 9/00 |
| 2021/0080939 A1* | 3/2021 | Yarmus | G05B 23/0254 |

OTHER PUBLICATIONS

Cheung et al., CN 101080700, (translation) Nov. 28, 2007, 25 pgs <CN_101080700.pdf >.*
Wang et al., CN 101221230, (translation), Jul. 16, 2008, 6 pgs <CN_101221230.pdf>.*
Zhou et al., CN 108153146, (translation), Oct. 27, 2020, 23 pgs <CN_108153146.pdf >.*
Hines et al., "A Hybrid Redundant Sensor Estimation Technique for 2-Channel Systems," 14th Annual Joint ISA POWID/EPRI Controls and Instrumentation Conference (2004).
U.S. Appl. No. 16/851,449, "Successive Maximum Error Reduction," filed Apr. 17, 2020.
Office Action for United Kingdom Application No. GB2118724.0, dated Oct. 3, 2022.
Singer et al., "A pattern-recognition-based, fault-tolerant monitoring and diagnostic technique", Symposium on Nuclear Reactor Surveillance and Diagnostics, vol. 2, 1-08 (1995).
Yu et al., "Eliminating false alarms caused by fault propagation in signal validation by sub-grouping", Progress in Nuclear Energy, vol. 48, pp. 371-379 (2006).

* cited by examiner

FAULTY VARIABLE IDENTIFICATION TECHNIQUE FOR DATA-DRIVEN FAULT DETECTION WITHIN A PROCESS PLANT

TECHNICAL FIELD

The present invention relates generally to process plants such as power generation and industrial manufacturing plants and, more particularly, to a multivariate statistics-based pattern recognition and fault detection system that performs highly accurate, robust faulty variable identification to detect and characterize faults within the operation of the process plant.

DESCRIPTION OF THE RELATED ART

Distributed process control systems, like those typically used in power generation, chemical manufacturing, petroleum processing or other process plants, typically include one or more process controllers communicatively coupled to one or more field devices via analog, digital or combined analog/digital buses. The field devices, which may be, for example, valves, valve positioners, switches, transmitters (e.g., temperature, pressure, level and flow rate sensors), burners, etc. are located within the process environment and perform process functions such as opening or closing valves, measuring process parameters, etc. in response to control signals developed and sent by the process controllers. Smart field devices, such as the field devices conforming to any of the well-known Fieldbus protocols may also perform control calculations, alarming functions, and other functions commonly implemented within or by a process controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART and Fieldbus field devices. The control modules within the controller send the process control signals over the communication lines to the field devices to thereby control the operation of the process.

Information from the field devices and the controller is usually made available over a data highway to one or more other computer devices, such as operator workstations, personal computers, data historians, report generators, centralized databases, etc., typically placed in control rooms or other locations away from the harsher plant environment. These computer devices may also run applications that may, for example, enable an operator to perform functions with respect to the process, such as changing settings of the process control routine, modifying the operation of the control modules within the controller or the field devices, viewing the current state of the process, viewing alarms generated by field devices and controllers, keeping and updating a configuration database, etc.

As an example, the Ovation® control system, sold by Emerson Automation Solutions, includes multiple applications stored within and executed by different devices located at diverse places within a process plant. A configuration application, which resides in one or more engineer workstations, enables users to create or change process control modules and to download these process control modules via a data highway to dedicated distributed controllers. Typically, these control modules are made up of communicatively interconnected function blocks, which are objects in an object oriented programming protocol and which perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may execute in a still further computer attached to the data highway to store the current process control routine configuration and data associated therewith. Alternatively, the configuration database may be located in the same workstation as the configuration application.

Generally speaking, the control of processes in an industrial plant, such as a power plant, often involves implementing a time ordered set of control actions on various equipment within the plant. This is especially true during plant equipment start-up and shut-down. The initiation of each successive control action is predicated on the completion of the previous control action as well as the condition of some number of permissives to be satisfied. The control of the plant thus proceeds in a step-by-step manner and the control system software that performs this time ordered operation is programmed using a software construct known as sequencing logic. In particular, sequencing logic is a logical set of operations, permissives, and actions, implemented as a computer program, which is executed in a control system. Generally, each sequencing logic includes a series of related steps that are executed in a consecutive manner. Each step generally includes or represents some number of permissives that need to be satisfied and one or more actions to be completed before the conclusion of that step. Permissives are typically a function of one or more external feedback inputs, parameters, and statuses that are evaluated in a logical fashion by the control program. For example, the evaluation or status of each permissive may be the result of a logical operation that evaluates to a true or a false condition. These permissives can be, for example, the state of field equipment (e.g. running/stopped/open/close), the completion of a previous step or action, values of process parameters being above or below a particular threshold, etc. Moreover, the transition from each consecutive step in the logic sequence is predicated on the evaluation of each permissive signal that applies to that step.

As a result, the application designer configures the sequencing logic to require that the permissives be satisfied, meaning that these permissives must evaluate to the expected Boolean state of true or false, prior to going to the next step. Thus, at each step, one or more permissives are evaluated, and when each of these permissives is satisfied, the actions for that step are taken. Once the actions are complete, that step is indicated as complete and the process repeats for the next step in the sequencing logic.

During normal plant operation, the control system is generally operated in an automatic mode and the sequence program or sequencing logic evaluates the feedback signals in determining when to transition to the next step in the sequencing logic without direct human interaction. The associated actions are then performed at each step by the sequence program.

At times, however, the plant may experience an abnormal situation where, for example, one of the expected feedback signals related to the permissives, for example, does not occur in the manner expected. This situation may result in the sequence program halting or stalling. Once the sequence program is stalled, however, human interaction is generally required to resolve the issue and to allow the sequence program to continue. Importantly, a sequence stall can result in the halt of equipment, which can result in manufacturing delays, lost production or revenue, higher operating costs and possibly even equipment damage. In a traditional control system however, the operator may not be aware of an impending abnormal situation, and the resulting sequence stall, until the situation actually occurs and the sequence is halted.

A primary contributor to operator unawareness, and thus the development of sequence-stalling events, is the sheer complexity of the systems involved in process control. Such large and dynamic systems as electrical power plants and oil refineries incorporate thousands of sensors and actuators to determine and to control the physical parameters of the system. Correspondingly, it becomes a monumental task in such systems to verify that the important process parameters are within their appropriate operating ranges. To further complicate matters, the process plant may operate in a multitude of different states to accommodate different production requirements. For example, an electrical power plant may produce different levels of power depending on the amount of power currently required over the associated electrical grid. As a result, the sensors, actuators, and other components of the process control system may have different acceptable ranges of their important operating parameters corresponding to each potential operating state of the plant. Traditional systems designed to monitor and to verify these important parameters check the current values of the parameters against known upper and lower limits for each mode of operation for each state of the plant. However, such monitoring techniques are not complete because the techniques ignore correlations that exist between and among the various parameters of the system.

These correlations can be important, however, because a change to any of the process parameters in a process may impact the values of the other process parameters in the process. To illustrate, assume the process variables of a process include only a temperature and a pressure. The temperature and pressure may be correlated, and as a result, a change in pressure results in a change in temperature. However, the resulting change in temperature is not a random event. The pressure and temperature are correlated in a known, predictable manner. Thus, a desired change in temperature may be achieved, for example, by changing the pressure by a known amount. Unfortunately, power plants and other environments implementing process control systems are generally not a set of small closed systems where each pair of process variables only impact one another. Instead, typical process control system environments include a large number of process variables interacting with one another, meaning a change in one process variable may impact a number of other process variables. As a result, creating a set of one-to-one relationships for process variables, similar to that illustrated in the fictional system above (e.g., pressure-to-temperature), may not adequately describe the correlations between and among the process variables. Nonetheless, even in such large systems, the resulting changes to a plurality of process variables due to a change in any one process variable are still quantifiable and predictable.

For example, a data-driven approach may be used to derive these correlations in large systems. This approach generally involves collecting a large amount of data for each process variable. After collection, the data is then analyzed to determine estimated correlations between each set of process variables. By analyzing data sets that include measurement values for each variable before and after changes to other process variables, the data-driven approach may provide an approximate value for any process variable following a change to any other process variable. Generally, this data-driven approach provides a more accurate estimation as more data is included because the data-driven approach relies on a robust data set to make accurate estimations. In any event, these estimated correlations can be implemented in an on-line environment of the process plant to verify that the important process parameters are within their appropriate operating ranges.

State estimation is a known technique to accurately incorporate such correlations into an on-line environment of a process plant. Simply put, state estimation techniques verify that important process parameters are within appropriate operating ranges by, in part, accounting for the correlations between and among the important process parameters. Multivariate State Estimation Technique (MSET) is a common method of implementing state estimation that involves establishing and monitoring a predefined list of significant process parameters, with each significant process parameter having an associated upper and lower operating limit for each operating state of the process plant. Often, the process control system issues parameter-specific alarms if any of the parameters violates these predefined limits. The strength of this technique derives from the fact that, as explained above, process parameters are coupled, or at least, are correlated with each other. In other words, a change in one process parameter may affect one, some, or every other process parameter. Thus, movement of one significant process parameter without corresponding changes in other process parameters can be a precursor to component failure, process drift, or more immediately, a sequence stall.

More specifically, a MSET determines whether a process is operating "normally" by estimating a set of significant process parameter values of the process based on on-line data, and determining if the on-line data deviates substantially from the estimation. Generally speaking, the process is considered to be operating "normally" if each of the process variables is within a specified threshold range, outside of which, may indicate the process is trending toward a failure condition (e.g., component failure, sequence stall, etc.). To illustrate, a fault detection system incorporated in a process control system may include a MSET in memory to facilitate monitoring the significant process parameters. The fault detection system may first receive a set of on-line data directly from sensors actively monitoring process parameters of the process. The on-line data comprises numerical values representing the measured levels of each process variable. For example, a value representing the measured level of pressure in the on-line data may indicate 5 pounds per square inch (psi). Similarly, values representing the temperature, viscosity, flow rate, and/or any other significant process variable may comprise the on-line data.

After receiving the on-line data, the fault detection system uses the on-line data in a series of mathematical operations defining the MSET. The operations yield a set of estimated data, against which, the fault detection system compares the on-line data to calculate an "estimation error." Generally, the estimated data reflects the estimated values for each significant process parameter included in the on-line data based on the estimated relationships between and among the significant process parameters, as described above. More specifically, the estimated data represents values for each process variable based on the relationship that each respective process variable bears to every other process variable included in the data set. The estimation error is generally related to the difference between the on-line data and the estimated data, and may be, for example, the arithmetic difference between the two values, an RMS error value, or a percentage deviation away from the acceptable range of normal operating values for a process variable. If the fault detection system determines that the on-line data does not substantially deviate from the estimated data (e.g., the estimation error satisfies a threshold value), the fault detection system determines that the on-line data represents a "normal" operating condition of the process. However, if the fault detection system determines that the on-line data substantially deviates from the estimated data, the fault detection system determines that the on-line data represents an "abnormal" operating condition of the process.

To illustrate, assume a system includes three process variables: temperature, pressure, and flow rate. In this example, assume a received on-line data set indicates that the temperature is 100° F. (Fahrenheit), the pressure is 200 psi, and the flow rate is 1 cubic meter per second. Using the MSET, the resulting set of estimated data may indicate that the estimated temperature is 103° F., the estimated pressure is 198 psi, and the estimated flow rate is 1.1 cubic meter per second. In this case, the temperature is estimated to be higher based on (i) the determined correlation between the temperature and pressure, (ii) the determined correlation between the temperature and flow rate, and (iii) the on-line data values of the temperature, pressure, and flow rate. A similar analysis applies to explain the lower estimated pressure and higher estimated flow rate. If any or all of the estimated values fall outside a predefined range, the fault detection system generates an alert to prompt an operator, technician, etc. to take corrective action.

Generally speaking, the mathematical operations defining the MSET involve the on-line data and a system matrix. As previously mentioned, the on-line data may be received directly from sensors actively monitoring process parameters of the process. The system matrix is a set of vectors where each vector is comprised of a set of variables that collectively represent a "normal" operating condition of the process. Similar to the on-line data, these variables are scalar values (e.g., numbers) corresponding to measurements of the process variables. The overarching purpose of the system matrix is to reliably produce accurate sets of estimated data when combined with the on-line data, in accordance with the mathematical operations of the MSET. If the system matrix is properly constructed, the estimated data accurately represents the expected values of each process variable in any on-line data set under normal operating conditions. Thus, when the system matrix is properly constructed, the fault detection system using a MSET is better able to accurately predict abnormal operating conditions of the process. In any event, because each vector within the system matrix represents a "normal" operating condition of the process, the process variable values comprising each vector may be relied upon to accurately represent the correlations that exist between and among each of the process variables. As a result, the system matrix better encapsulates the correlations between and among the significant process parameters of the process as more vectors representing "normal" operating conditions of the process are included into the system matrix. In this manner, the accuracy of the estimated data sets produced using the system matrix in a MSET is related to the number of vectors comprising the system matrix (e.g., the "size" of the system matrix).

Occasionally, one or more process variables monitored by a fault detection system operating within a process plant and applying a MSET with a properly constructed system matrix may fluctuate outside of their "normal" operating ranges and cause the fault detection system to identify a fault condition, indicating that at least a portion of the systems comprising the process plant are malfunctioning or trending towards a malfunction. Ideally, the fault condition identified by the fault detection system indicates which process variable(s) are "abnormal" (also referenced herein as "faulty variables") to allow a system engineer/operator to diagnose potentially malfunctioning system(s) within the process plant. Unfortunately, the estimation error associated with the faulty variable(s) propagates to the "normal" process variables as a result of the relationships between the process variables encapsulated in the system matrix of the MSET, and may cause conventional fault detection systems to erroneously identify the "normal" process variables as faulty variables. The underlying reason is that conventional multivariate statistics-based methods (such as MSET) generally minimize the distance between the estimated vector(s) and the observed vector(s) using a least-square metric (e.g., RMS error). However, the minimal distance is usually measured in vector's Euclidian norm, which does not always consider the approximation of each individual vector component in comparison.

The faulty variable(s) typically yield the largest estimation error, which generally indicates the process variables causing the "abnormal" operating condition of the process plant. Accordingly, many conventional fault detection systems are configured to identify the faulty variable(s) based purely on the estimation error magnitude. However, "normal" process variables may occasionally yield the largest estimation error due to the propagated estimation error from the faulty variable(s), and as a result, many conventional fault detection systems may erroneously identify the "normal" process variables as faulty variables.

While many fault detection systems have been proposed and used in process plants, only the most complex fault detection systems are typically able to perform high fidelity verification of the process operation because of the ever-changing conditions within a process plant, including the degradation of devices over time, the presence of unaccounted for disturbance variables within the plant, etc. Moreover, in many known process control systems, it can be difficult to identify "abnormal" operating conditions and the corresponding faulty variables because of the large number of process control variables and their complex set of relationships. As mentioned, faulty variable identification is further complicated because existing fault detection systems are configured to identify the faulty variable(s) based on the estimation error magnitude, which is not an accurate metric in every circumstance. As a result, most conventional fault detection systems that use a MSET are unable to accurately identify faulty variable measurements.

SUMMARY

An improved faulty variable identification technique for a fault detection system using a MSET builds miniature system matrices corresponding to each pair of process variables and/or applies a modified binary search algorithm to divided system matrices to identify the faulty variable(s). The improved faulty variable identification technique iteratively constructs and trains miniature system matrices from an initial system matrix, applies on-line data to each miniature system matrix, and determines faulty variable(s) based on the number of times a particular process variable exceeds an error threshold. If the initial system matrix includes a large number of process variables, the improved faulty variable identification technique may also initially apply a modified binary search algorithm to the initial system matrix to reduce the number of miniature system matrices the fault detection system eventually creates. In this manner, the improved faulty variable identification technique may accurately and consistently identify faulty variables within on-line data.

More particularly, the improved faulty variable identification technique constructs multiple miniature system matrices in response to detecting an "abnormal" operating condition within the process plant by grouping data from the initial system matrix for each respective pair of process variables into new matrices. These new matrices are trained to create miniature system matrices for each pair of process variables, and the miniature system matrices are applied to on-line data corresponding to each respective pair of process variables using the MSET to calculate estimated values for each respective pair of process variables. The improved technique tracks a fault index for each process variable that increases each time the estimation error for a respective process variable exceeds a corresponding error threshold, and the process variable with the largest fault index is determined to be the faulty variable.

Moreover, the improved faulty variable identification technique may apply a modified binary search algorithm to divided system matrices to identify the faulty variable(s) in response to detecting an "abnormal" operating condition within the process plant. The improved technique may determine that the number of process variables included in the initial system matrix exceeds a threshold value that would cause the construction of miniature system matrices for each respective pair of process variables to consume too many processing resources. Accordingly, the improved technique may divide the initial system matrix in half to create a first new matrix and a second new matrix containing data representative of a first half of the process variables and a second half of the process variables, respectively. Both new matrices are trained to create two divided system matrices, and both divided system matrices are applied to on-line data using the MSET. The improved technique may also determine whether one or both divided system matrices include one or more faulty variables based on the estimation error for each process variable as a result of the MSET. Further, the improved technique may iteratively perform the division, training, and analysis actions with either divided system matrix containing the one or more faulty variables until the number of process variables in a divided system matrix containing one or more faulty variables falls below a threshold value, after which, the improved technique may proceed to construct miniature system matrices for each pair of process variables in the divided system matrix as previously described.

This improved faulty variable identification technique allows an operator to more quickly recognize abnormal conditions within the process operation and to accurately diagnose the underlying cause of such abnormal conditions. The operator may then potentially take action to alleviate the underlying cause of the problem, thus reducing the likelihood of or preventing a sequence stall of the control program or damage to equipment. The improved faulty variable identification technique systematically identifies faulty variables by deconstructing the initial system matrix and evaluating each respective pair of process variables using a respective miniature system matrix, which in turn increases the accuracy of the fault detection system and reduces operator confusion related to alerts generated by the fault detection system.

DESCRIPTION OF THE PREFERRED EMBODIMENTS

Figure 1:
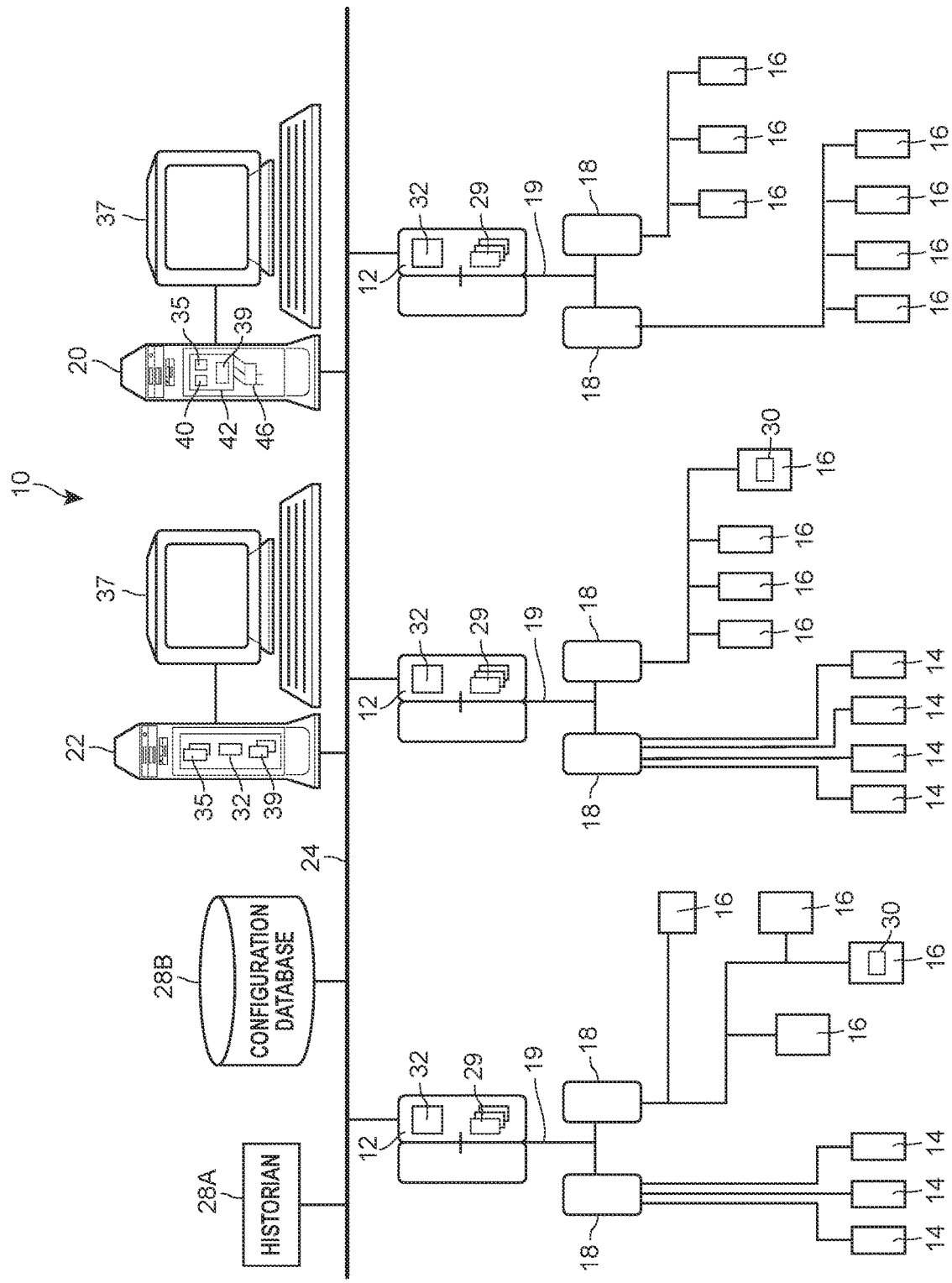
FIG. 1 is a block diagram of a distributed process control network located within a process plant including an operator workstation that implements an improved faulty variable identification technique for a fault detection system using a MSET, to thereby identify faulty variables as a result of fault conditions in the operation of the process plant.

FIG. 1 illustrates a process plant 10 having an example control network, such as that associated with a power generation plant, in which the improved faulty variable identification technique may be implemented. In particular, process plant 10 of FIG. 1 includes a distributed process control system, having one or more controllers 12, each of which is connected to one or more field devices 14 and 16 via a bus 19 and input/output (I/O) devices or cards 18 which may be, for example, Fieldbus interfaces, Profibus interfaces, HART interfaces, standard 4-20 ma interfaces, etc. The bus 19 can be any type of communication media such as a serial bus, a wireless bus or connection, or the I/O cards 18 can be located physically at the process controllers 12 or can be located remotely. The controllers 12 are also coupled to one or more host or operator/engineer workstations 20 and 22 via a data highway 24 which may be, for example, an Ethernet link. Databases 28A and 28B may be connected to the data highway 24 and operate as data historians which, in the case of the data historian 28A, collect and store historical parameter, status and other data associated with the controllers 12 and field devices 14, 16 within the plant 10 and, in the case of the configuration database 28B, may store configuration and other control data for the plant 10. For example, the database 28B may operate as a configuration database that stores the current configuration of the process control system within the plant 10 as downloaded to and stored within the controllers 12 and field devices 14 and 16. While the controllers 12, the I/O cards 18 and the field devices 14 and 16 are typically located down within and are distributed throughout the sometimes harsh plant environment, the operator/engineer workstations 20 and 22 and the databases 28A and 28B are usually located in a control room or other less harsh environments easily accessible by engineers, operators, or maintenance personnel.

As is known, each of the controllers 12, which may be by way of example, the Ovation® controller sold by Emerson Process Management Power and Water Solutions, Inc., stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the Ovation® system protocol use control modules and function blocks typically designed and implemented in an object oriented programming protocol, the control modules could be designed using any desired control programming scheme including, for example, sequential function chart, ladder logic, etc. and are not limited to being designed and implemented using the function block or any other particular programming technique.

In the plant 10 illustrated in FIG. 1, the field devices 14 and 16 are connected to the controllers 12 and may be standard 4-20 ma devices, may be smart field devices, such as HART, Profibus, or FOUNDATION® Fieldbus field devices, which include a processor and a memory, or may be any other desired types of field devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement one or more process control loops, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

Moreover, sequencing logic 32 may be stored in the controllers 12 or in one or more of the workstations 20, 22 or other computer devices, to oversee or control the various control programs to perform sequencing control activities. As noted above, the sequencing logic modules 32 implement a time ordered set of control actions on various equipment within the plant 10. The initiation of each successive control action is predicated on the completion of the previous control action as well as the condition of some number of permissives to be satisfied, which the sequencing logic 32 monitors. The control of the plant 10 thus proceeds in a step-by-step manner based on the operation of the sequencing logic 32. Generally, each sequencing logic 32 includes a series of related steps that are executed in a consecutive manner. Each step generally includes or represents some number of permissives that need to be satisfied and one or more actions to be completed before the conclusion of that step. Permissives are typically a function of one or more external feedback inputs, parameters, and statuses that are evaluated in a logical fashion by the control program. For example, the evaluation or status of each permissive is the result of a logical operation that evaluates to a true or false condition. These permissives can be, for example, the state of field equipment (e.g. running/stopped/open/close), the completion of a previous step or action, values of process parameters being above or below a particular threshold, etc. Moreover, the transition from each consecutive step in the logic sequence is predicated on the evaluation of each permissive signal that applies to that step.

Still further, in a known manner, one or more of the workstations 20 and 22 may include user interface applications to enable a user, such as an operator, a configuration engineer, a maintenance person, etc. to interface with the process control network within the plant 10. In particular, the workstation 22 is illustrated as including one or more user interface applications 35 which may be executed on a processor within the workstation 22 to communicate with the database 28, the control modules 29 or other routines within the controllers 12 or I/O devices 18, with the field devices 14 and 16 and the modules 30, 32 within these field devices, controllers, etc. to obtain information from the plant 10, such as information related to the ongoing state of the process control system. The user interface applications 35 may process and/or display this collected information on a display device 37 associated with one or more of the workstations 20 and 22. The collected, processed and/or displayed information may be, for example, process state information, alarms and alerts generated within the plant 10, maintenance data, etc. Likewise, one or more applications 39 may be stored in and executed in the workstations 22 and 20 to perform configuration activities such as creating or configuring the modules 29, 30, and 32 to be executed within the plant 10, to perform control operator activities, such as changing set-points or other control variables, within the plant 10, etc. Of course the number and type of routines 35 and 39 is not limited by the description provided herein and other numbers and types of process control related routines may be stored in and implemented within the workstations 20 and 22 if desired.

The workstation 20 of FIG. 1 is also illustrated as including a fault detection application 40, which may include a user interface application and data structures for performing fault detection with respect to the operation of the plant 10. In particular, the fault detection application 40 monitors the process plant control network being implemented by the control blocks 29, 30 and 32 as well as other control routines executed within the controllers 12 and possibly the field devices 14, 16. The fault detection application 40 can be accessed by any authorized user (such as a configuration engineer, an operator or some other type of user) to perform training of the fault detection application 40 or to analyze output of the application 40, and the fault detection application 40 enables a user to perform different training and fault detection activities with respect to the process plant 10 while the control system of the process plant 10 remains operational and on-line to control the plant 10.

As illustrated in FIG. 1, the fault detection application 40 may be stored in a memory 42 of the workstation 20 and each of the components of the fault detection application 40 is adapted to be executed on a processor 46 associated with the workstation 20. While the entire fault detection application 40 is illustrated as being stored in the workstation 20, some components of the fault detection application 40 could be stored in and executed in other workstations or computer devices within or associated with the plant 10. Furthermore, the fault detection application 40 can provide display outputs to the display screen 37 associated with the workstation 20 or any other desired display screen or display device, including hand-held devices, laptops, other workstations, printers, etc. Likewise, the fault detection application 40 may be broken up and executed on two or more computers or machines that may be configured to operate in conjunction with one another. For example, the application 40 can be executed within controllers 12, or field devices 14 and 16.

Generally speaking, the fault detection application 40 provides for or enables fault detection regarding the operation of the process plant 10, and more specifically, fault detection regarding the process plant control system implemented by the control routines 29, 30 and 32 within the controllers 12 and field devices 14 and 16. In particular, the fault detection application 40 may determine potentially abnormal operating conditions of the process plant 10 by applying a MSET to on-line process variable data received from the controllers 12 and field devices 14 and 16 to calculate a set of estimated values for each process variable represented in the on-line process variable data. The fault detection application 40 calculates an estimation error value for each process variable using the set of estimated values and the on-line process variable data, and the application 40 compares the estimation error value for each process variable to a corresponding estimation error threshold for each process variable. If the fault detection application 40 determines that the estimation error value for a respective process variable exceeds the corresponding estimation error threshold for the respective process variable, the application 40 determines that a potentially abnormal operating condition exists within the operation of the plant 10. Accordingly, the fault detection application 40 generates and transmits an alert signal to the display screen 37 or any other display screen or display device.

Generally, each estimation error threshold corresponds to a deviation of on-line process variable data from an estimated value generated by applying the MSET to the on-line process variable data. Typically, each estimation error threshold is calculated based on a percentage of an acceptable value range of the corresponding process variable during on-line operation of a process, and is calculated prior to the execution of the fault detection application 40.

For example, the sequencing logic 32 may instruct the controllers 12 to measure all or some process variables of the plant 10, and transmit the measurements to the fault detection application 40. The fault detection application 40 output may apply to a permissive of the sequencing logic 32. For example, if the application 40 determines that a potentially abnormal operating condition exists within the operation of the plant 10, the permissive may not be satisfied, the operation of the process within the plant 10 may not proceed to the subsequent step of the sequencing logic 32, and the fault detection application 40 may then generate and transmit the alert signal to the display screen 37 to prevent a potential sequence stall before a stall signal flags up.

However, before the fault detection application 40 may generate the alert signal, the application 40 must accurately identify the faulty variable included in the on-line data received from the controllers 12 and field devices 14 and 16. While the plant 10 that is being controlled will be described herein as a power generation plant being controlled using distributed control techniques, the faulty variable identification techniques described herein can be used in other types of plants and control systems, including industrial manufacturing plants, water and waste water treatment plants, as well as control systems implemented centrally or within a single computer, and therefore not distributed throughout the plant.

Figure 2:
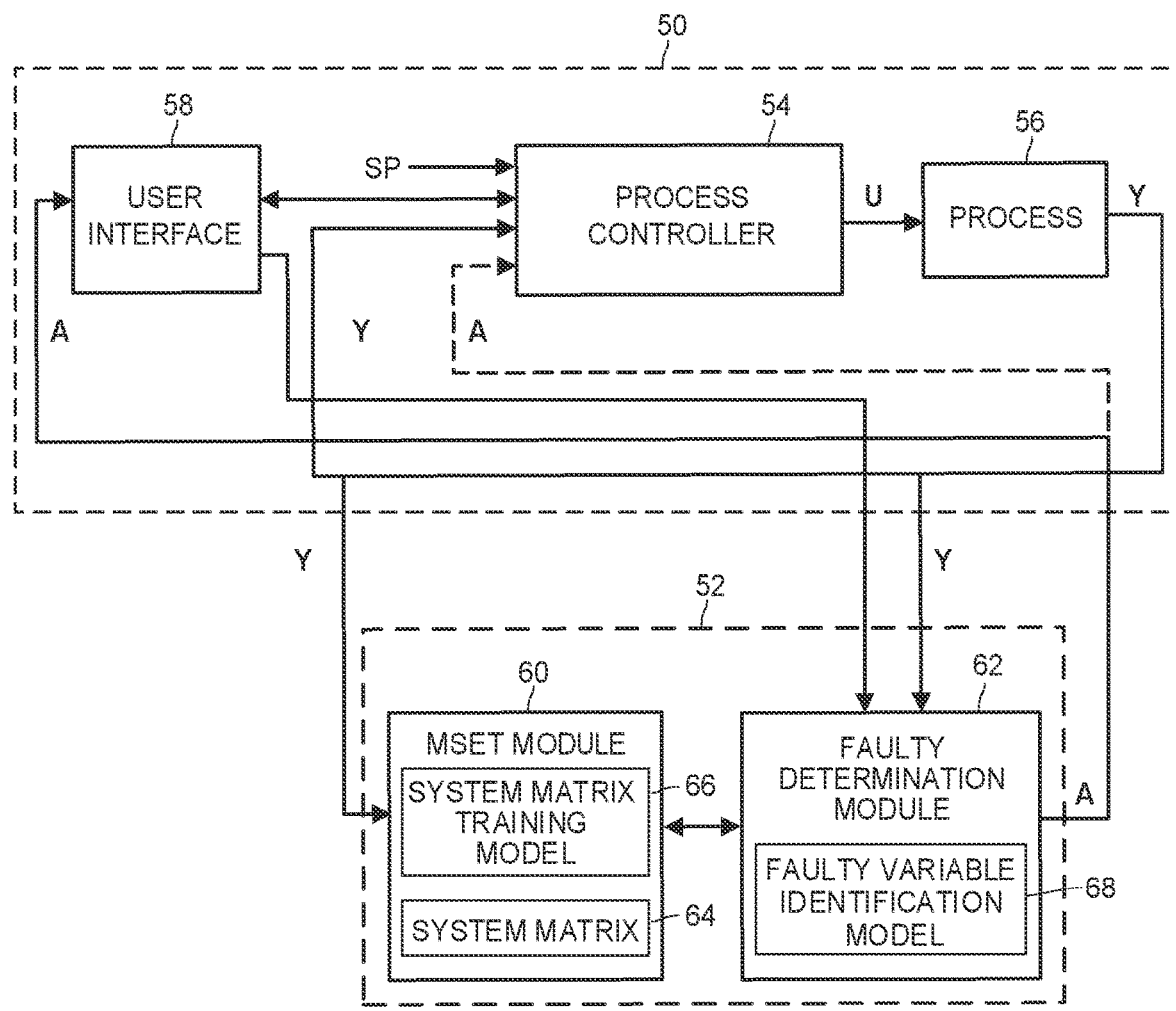
FIG. 2 is a block diagram of a fault detection system using a MSET that implements an improved faulty variable identification technique, to thereby identify faulty variables as a result of fault conditions in the operation of the process plant.

FIG. 2 generally illustrates an example process control system 50 and fault detection system 52 to perform fault detection within, for example, the plant 10 of FIG. 1. The process control system 50 may include the control modules 29, 30 and 32 of FIG. 1 as well and any other control routines disposed in and executed within the various control devices (e.g., controllers 12) and field devices (e.g., devices 14 and 16) of the plant 10 of FIG. 1. The fault detection system 52 may be incorporated in the operator/engineer workstation 20 or 22, the memory 42, and more specifically, as part of the fault detection application 40.

Generally speaking, the process control system 50 monitors physical parameters (e.g., temperature, pressure, etc.) of a process operating within a plant (e.g., plant 10) to determine when the physical parameters may need to change. More specifically, the process control system 50, may measure outputs from field devices that control the physical parameters of the process to generate control signals that adjust the operation of the field devices to change the physical parameters as necessary. The process control system 50 may generate these control signals in response to, for example, receiving a new set point of the process or detecting the existence of a fault condition within the operation of the process. Moreover, the process control system 50 may record on-line data of a process and receive error thresholds (e.g., from a data historian) corresponding to each process variable, and notify an operator of changes taking place to the one or more field devices. Further, the process control system 50 may receive input from an operator regarding adjustments to the one or more field devices, such as a new setpoint of the plant or a control signal for a particular field device.

The fault detection system 52 generally detects the existence of fault conditions within the operation of a process by utilizing a MSET. The process control system 50 records and/or receives a set of data comprising, for example, on-line data of the process and error thresholds corresponding to each process variable that the process control system 50 transmits to the fault detection system 52 to perform real-time fault detection and faulty variable identification. Upon receipt of the set of data, the fault detection system 52 compares the on-line data to estimated data generated using the MSET. If the fault detection system 52 determines that the estimation error associated with any process variable represented in the on-line data exceeds an estimation error threshold, the fault detection system 52 may determine the existence of a fault in the process operation and generate an alert signal to inform an operator.

In particular, the process control system 50 includes a process controller 54 communicatively and physically coupled to a process 56 as well as to a user interface 58. The process controller 54 may include the controllers 12 of FIG. 1 which produce one or more control signals to be delivered to the various control devices within the plant 10 and the control signals implemented by or generated by the sequencing logic 32 to control the control modules within the process, and which together operate to control the plant 10. Of course, the process controller 54 can include any desired types of controllers which implement any desired types of control routines or techniques, such as PID, fuzzy logic, neural network, model predictive control routines, etc.

Likewise, the process 56 includes the units, machines, devices and associated hardware set up to implement the process being controlled. For example, in a power generation plant, the process 56 may include generators, fuel delivery systems, heat exchanges, condensers, steam generators, valves, tanks, etc. as well as sensors and transmitters disposed within the plant to measure various process parameters or variables.

The user interface 58 may allow an operator to view and/or interact with data associated with the process controller 54 and the process 56. Namely, the user interface 58 may be a workstation (e.g., workstation 20) and may have a display screen enabling the operator to view control signals generated by the process controller 54, on-line data from the process 56, and/or other suitable data. The operator may also input commands through the user interface 58, such as control signals to control the operation of the process 56, error thresholds corresponding to each process variable, and instructions to perform a faulty variable identification.

More specifically, the process controller 54 may receive on-line data Y from the process 56 and generate one or more control signals U that adjust the operation of one or more field devices (e.g., field devices 14, 16) based on the on-line data Y. These control signals are illustrated by the vector U in FIG. 2 to indicate that the process controller 54 may provide a vector of control signals to the process 56 to control the operation of the plant 10. Likewise, as illustrated in FIG. 2, a vector Y of process variables are measured within the process 56 (such as by sensors, etc.) and are delivered as feedback signals to the process controller 54 for use in producing the control signals U. The process controller 54 may also receive additional inputs such as setpoint values SP and state variables for use in producing the control signals U, and these inputs may be delivered by an operator at the user interface 58.

In practice, the on-line data Y, as measured within the process 56, represents a continuous or at least frequently updated stream of data representing the current operating state of the process 56. The process controller 54 aggregates the on-line data Y by executing routines to determine and select normal process variable measurements or simply by receiving a command to aggregate the on-line data Y.

For example, the process controller 54 may receive a setpoint from an operator indicating that the plant 10 is changing from a first operating state to a second operating state that requires a higher temperature within certain portions of the plant 10. The process controller 54 may also receive a set of on-line data Y indicating current physical parameters, such as a current state variable, at least at the certain portions of the plant requiring the higher temperature. The process controller 54 may then analyze the set of on-line data Y to generate one or more control signals U that adjust the operation of one or more field devices (e.g., open/close valves, activate/deactivate fans, etc.) to yield the higher temperature within the certain portions of the plant 10. After the field devices adjust, the process 56 (e.g., via the field devices) may transmit a subsequent set of on-line data Y, including a subsequent state variable, to the process controller 54 to confirm the higher temperature in the certain portions of the plant 10.

In any event, once the process controller 54 receives a set of on-line data Y, the process controller 54 may store the set of on-line data Y in memory (e.g., memory 42). For example, an operator may utilize the user interface 58 to input an instruction causing the process controller 54 to store the set of on-line data Y. The operator may also input an instruction to begin a fault detection operations of the fault detection system 52. The process control system 50 may then transmit all or a portion of the stored on-line data to the fault detection system 52 to be used in fault detection operations.

In practice, the fault detection system 52 is configured to detect potential fault conditions (e.g., "abnormal" operating conditions) within the plant 10. To do this, the fault detection system 52 applies the mathematical operations defining the MSET to the on-line data Y to identify any process variable in the on-line data Y that exceeds its corresponding estimation error threshold, and generates an alert signal for the process control system 50 indicating any abnormal operating conditions.

As illustrated in FIG. 2, the fault detection system 52 includes a MSET module 60 and a fault determination module 62. The MSET module 60 may generally perform the MSET using the on-line data Y and a system matrix 64 to generate estimated data for each process variable. Further, the MSET module 60 may train system matrices for use in the MSET using a system matrix training model 66.

The fault determination module 62 may determine whether or not the process 56 is operating under any abnormal conditions by calculating estimation errors for each process variable and comparing those estimation errors to the corresponding estimation error threshold. If the fault determination module 62 determines that at least one estimation error exceeds or otherwise fails to satisfy the corresponding estimation error threshold, the module 62 may also identify one or more faulty variables included in the on-line data Y using a faulty variable identification model 68. The fault determination module 62 may further generate an alert signal A to notify a user/operator that the process 56 is operating under abnormal conditions, and to further inform the user/operator which process variable may be faulty. In this manner, the fault determination module 62 may alert an operator to abnormal process 56 operating conditions which allows the operator to take corrective actions to prevent equipment damage, equipment failure, sequence stalls, or other potential plant 10 issues.

Figure 3:
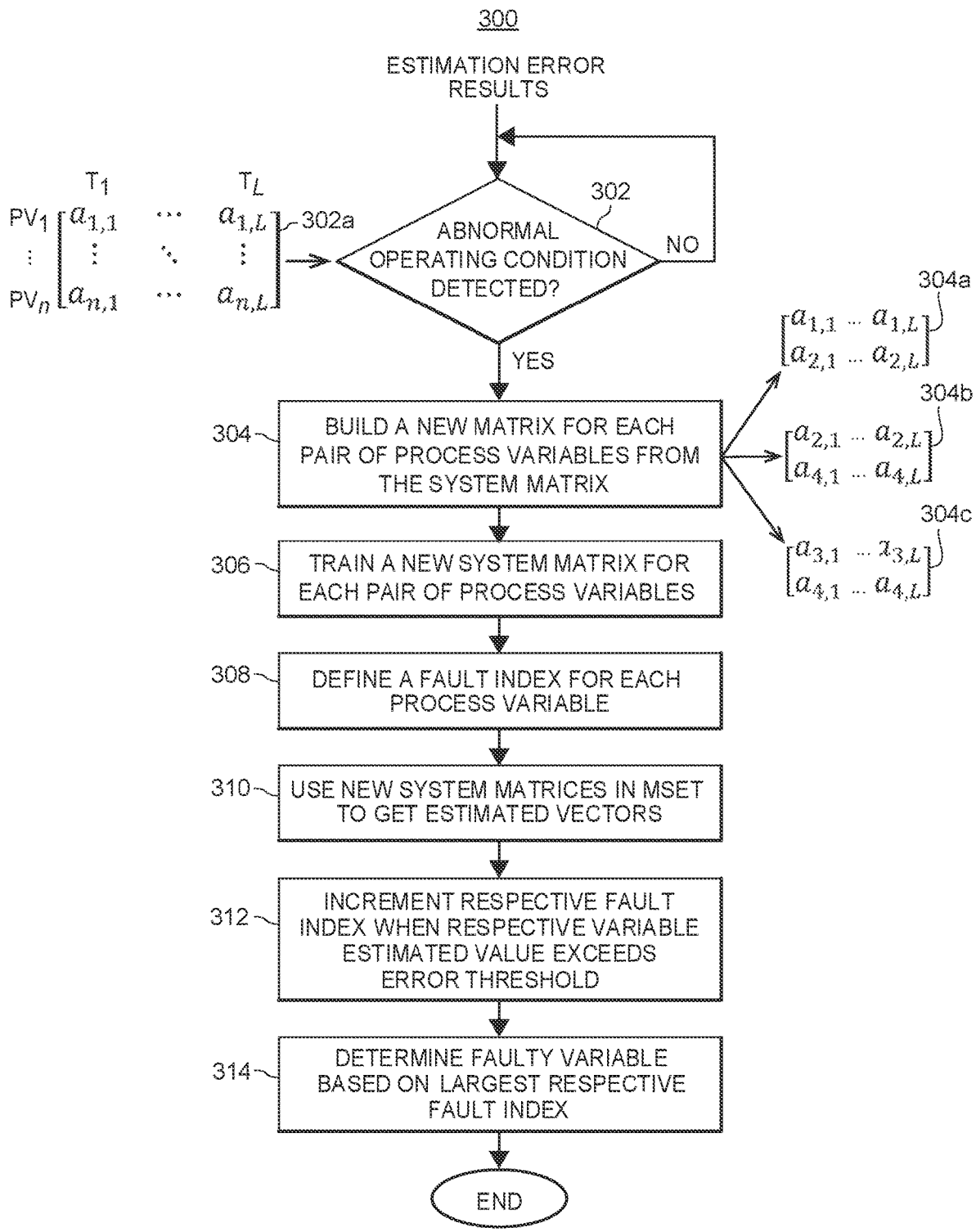
FIG. 3 is a flow diagram of an improved faulty variable identification technique that identifies faulty variables in on-line process variable data as part of a fault detection system to identify faulty variables as a result of fault conditions in the operation of the process plant.

FIG. 3 is a flow diagram of an improved faulty variable identification technique 300 that identifies faulty variables in on-line process variable data as part of a fault detection system to identify faulty variables as a result of fault conditions in the operation of the plant 10. The fault detection system 52 of FIG. 2 may incorporate and/or perform some or all of the actions described herein with respect to the faulty variable identification technique 300, and one or more actions of the faulty variable identification technique 300 are explained herein with reference to FIGS. 4A-C. Moreover, as used herein, "identifying" faulty variables generally refers to determining that a respective process variable within on-line process variable data is faulty. The "location" of faulty variables within a system matrix and "locating" faulty variables within a system matrix generally refers to whether or not a system matrix contains data representative of a variable identified as a faulty variable.

The faulty variable identification technique 300 may start (YES branch of block 302) when the fault determination module 62 determines that at least one estimation error for a process variable in the on-line data Y exceeds or otherwise fails to satisfy the corresponding estimation error threshold. However, if the estimation error for each process variable satisfies the corresponding estimation error threshold, the faulty variable identification technique 300 may not start (NO branch of block 302). For example, the fault determination module 62 may determine that the estimation error for a process variable exceeds or otherwise fails to satisfy the corresponding error threshold using data similar to that illustrated in the diagram 400 of FIG. 4A. Each process variable plot 402a, 402b, and 402c represents on-line measurements of a respective process variable over time (as represented on the x-axis 404). Namely, the y-axis 406 of plot 402a may represent load in Megawatts, the y-axis 408 of plot 402b may represent the post-combustion oxygen percentage of the plant 10, and the y-axis 410 of plot 402c may represent the pounds per million BTUs of nitrogen oxides. The estimation error threshold may be one percent of the data range, and the fault determination module 62 may not recognize any abnormal operating conditions prior to the $300^{th}$ sampling point, when the nitrogen oxides concentration begins to steadily rise. This may occur, for example, when a nitrogen oxides emission control equipment malfunctions and fails to effectively curb nitrogen oxides emissions. The line in the region of interest 412 with lower corresponding y-axis 410 values indicates normal levels of the nitrogen oxides concentration based upon the relative levels of the load in plot 402a and the post-combustion oxygen percentage in plot 402b at the same sampling points. The observed values (indicated by the line in the region of interest 412 with higher corresponding y-axis 410 values) maintain a relatively constant elevated level 414 above the normal values that exceeds the one percent estimation error threshold. Accordingly, in this example, the fault determination module 62 may start the faulty variable identification technique 300 to eventually determine that the nitrogen oxides concentration is the faulty process variable.

In any event, the faulty variable identification technique 300 may obtain the system matrix 302a (e.g., system matrix 64 of FIG. 2) to perform several subsequent actions. Each column of the system matrix 302a may represent a measurement of each process variable (e.g., $PV_1, PV_2, \ldots, PV_n$) of the process at a distinct moment in time (e.g., $T_1, T_2, \ldots, T_L$) during the on-line operation of the process. Each row of the system matrix 302a may represent measurements of an individual process variable of the process at different moments in time during the on-line operation of the process. For example, assume a process has n process variables and each of the process variables is measured L times. The system matrix 302a may have n×L entries, and each entry in the system matrix 302a may be an on-line measurement of a process variable of the process. Accordingly, $a_{1,1}$ is an on-line measurement for a first process variable taken at a first time, $a_{2,1}$ is an on-line measurement for a second process variable taken at the first time, $a_{2,2}$ is an on-line measurement for the second process variable taken at a second time, etc.

As previously mentioned, the estimation error associated with a faulty variable propagates to the estimation error of other non-faulty variables, causing the estimation error of all variables to increase. As a result, identifying faulty variables is increasingly difficult when the number of process variables evaluated in tandem with the faulty variables increases. To minimize this effect, the faulty variable identification technique 300 deconstructs the system matrix 302a and evaluates the process variables on a more pairwise basis.

Accordingly, the faulty variable identification technique 300 continues by building a new matrix for each pair of process variables included in the system matrix 302a (block 304). Generally, the faulty variable identification technique 300 deconstructs the system matrix 302a into multiple smaller matrices by placing the data corresponding to each unique pair of process variables into individual matrices. To illustrate, each of the new matrices 304a, 304b, and 304c include a unique pairing of process variable data. New matrix 304a includes all process variable data from the system matrix 302a corresponding to process variables one and two. New matrix 304b includes all process variable data from the system matrix 302a corresponding to process variables two and four. New matrix 304c includes all process variable data from the system matrix 302a corresponding to process variables three and four. The faulty variable identification technique 300 builds similar matrices for each unique pair of process variables included in the on-line data Y. Mathematically, the number of new matrices generated by the faulty variable identification technique 300 at this block is described by:

$$^2_n C = \frac{n!}{(n-2)!\,2!} \quad (1)$$

where C represents the combination statistical operation and n represents the number of process variables in the on-line data Y.

Using each of these new matrices, the faulty variable identification technique 300 continues by training a new system matrix for each pair of process variables (block 306). The faulty variable identification technique 300 may utilize, for example, the MSET module 60 to apply the system matrix training model 66, which in turn may incorporate any suitable system matrix training technique. For example, the system matrix training model 66 may build a new system matrix using vectors from the new matrix and may apply the MSET using the new system matrix to on-line data associated with the two process variables included in the new matrix. Of course, the MSET module 60 may, by applying the system matrix training model 66, train a new system matrix for each respective pair of process variables for which a new matrix is built (e.g., 304a-c, etc.).

Generally, the faulty variable identification technique 300, via the MSET module 60, applies the MSET to on-line data in accordance with the formula:

$$X_e = D_i \cdot (D_i^T \otimes D_i)^{-1} \cdot (D_i^T \otimes X_o) \quad (2)$$

to generate the estimated data, where $X_o$ is an observed vector in the on-line data, and $X_e$ is an estimated vector in the estimated data. For any on-line data set containing L observed vectors (e.g., $X_{o,1}, X_{o,2}, X_{o,3}, \ldots, X_{o,L}$), the MSET module 60 determines L corresponding estimated vectors (e.g., $X_{e,1}, X_{e,2}, X_{e,3}, \ldots, X_{e,L}$). For example, assume that the on-line data set includes three observed vectors (e.g., $X_{o,1}, X_{o,2},$ and $X_{o,3}$). By operating the system matrix on each of the observed vectors ($X_{o,1}, X_{o,2},$ and $X_{o,3}$) in accordance with equation (2), the MSET module 60 determines three corresponding estimated vectors (e.g., $X_{e,1}, X_{e,2},$ and $X_{e,3}$).

With these new system matrices, the faulty variable identification technique 300 may more readily identify the faulty variable(s) by isolating the effects of the estimation error propagation to the individual process variable pairs. The faulty variable identification technique 300 may define a fault index for each process variable (block 308) in preparation for evaluating each pair of process variables by applying the MSET with each respective system matrix to online data featuring the respective process variables included in the respective system matrix. The fault index represents a running tally of the number of times the estimation error associated with a system matrix including a respective process variable exceeds or otherwise fails to satisfy the estimation error threshold. For example, assume the process under evaluation includes the process variables illustrated in FIG. 4A. At this point in the faulty variable identification technique 300, the MSET module 60 has trained three new system matrices including a new system matrix for load and post-combustion oxygen percentage, a new system matrix for load and nitrogen oxides concentration, and a new system matrix for post-combustion oxygen percentage and nitrogen oxides concentration. The fault index for each process variable can range from zero to two because each process variable is included in two unique system matrices.

The faulty variable identification technique 300 may then apply the MSET using each respective system matrix to on-line data corresponding to the respective process variables included in the respective system matrix (block 310). Moreover, each time the estimation error for either variable exceeds or otherwise fails to satisfy the corresponding estimation error threshold, the fault determination module 62 may increment the fault index of both respective process variables (block 312).

To illustrate, once the MSET module 60 calculates the estimated data, the faulty variable identification technique 300 may utilize the fault determination module 62 to calculate an RMS error value for each process variable by comparing each estimated vector $X_e$ in the estimated data to a corresponding observed vector $X_o$ from the on-line data. Generally, the fault determination module 62 may generate difference values for each process variable value according to the following formula:

$$\Delta_{i,j} = x_{i,j,est} - x_{i,j,obs} \tag{3}$$

where i corresponds to the process variables included in the respective new system matrix, and j corresponds to a respective data sample included in the on-line data (e.g., 1, . . . , W). Namely, the fault determination module 62 may subtract each on-line data value (e.g., $x_{1,1,obs}, x_{1,2,obs}, x_{1,3,obs}, \ldots, x_{n,W,obs}$) (the designation "obs" generally references observed data of the process) from a corresponding estimated data value (e.g., $x_{1,1,est}, x_{1,2,est}, x_{1,3,est}, \ldots, x_{n,W,est}$) (the designation "est" generally references estimated data of the process) to generate each difference value (e.g., $\Delta_{1,1}, \Delta_{1,2}, \Delta_{1,3}, \ldots, \Delta_{n,W}$). For example, the fault determination module 62 may subtract entry $x_{1,1,obs}$ from $x_{1,1,est}$ to generate difference value $\Delta_{1,1}$. In embodiments, the difference values may be the estimation error.

The fault determination module 62 may also calculate the RMS error value for each process variable, in accordance with the following formula:

$$Erms_{i,1} = \sqrt{\frac{\sum_{j=1}^{L}(X_{e,j}(i) - X_{o,j}(i))^2}{L}} \tag{4}$$

where i corresponds to the process variables included in the respective new system matrix. For example, the fault determination module 62 may calculate the RMS error for a first process variable ($PV_1$) to generate the RMS error value $Erms_{1,1}$.

Typically, the RMS error value is used as the estimation error. Accordingly, the fault determination module 62 may also compare the RMS error for each process variable included in the respective new system matrix to a corresponding estimation error threshold (e.g., an RMS error threshold) to determine whether any RMS error values exceed the corresponding estimation error threshold. In any event, the fault determination module 62 may subtract the estimation error threshold value corresponding to a respective process variable from the RMS error value corresponding to the respective process variable to calculate an estimation error difference value. More specifically, the fault determination module 62 calculates estimation error difference values in accordance with the formula:

$$Derr_{i,1} = Erms_{i,1} - Terr_{i,1} \tag{5}$$

where i corresponds to the process variables included in the respective new system matrix. For example, the fault determination module 62 may calculate the estimation error difference for the first process variable ($PV_1$) to generate the estimation error difference value $Derr_{1,1}$. The fault determination module 62 may then determine whether or not the estimation error difference value exceeds the estimation error threshold value in accordance with the following relation:

$$0 < Derr_{i,1} \tag{6}$$

where i corresponds to the process variables included in the respective new system matrix. If the fault determination module 62 determines, using equation (6), that the estimation error difference value for a respective process variable is greater than zero, then the module 62 may further determine that the estimation error difference value exceeds the estimation error threshold value, and as a result, the module 62 may increase the fault index for all process variables included in the respective new system matrix. Alternatively, if the fault determination module 62 determines, using equation (6), that the estimation error difference value for a respective process variable is less than or equal to zero, then the module 62 may further determine that the estimation error difference value does not exceed the estimation error threshold value, and as a result, the module 62 may not increase the fault index for all process variables included in the respective new system matrix.

Of course, it is to be understood that any suitable or desirable error value may be used. Moreover, any suitable metric may be used as the estimation error threshold value. For example, the estimation error threshold value may be a percentage deviation from an acceptable range of known values corresponding to a respective process variable. If the fault determination module 62 determines that the estimation error value for a respective process variable deviates from the acceptable range of known values corresponding to the respective process variable by greater than the acceptable percentage deviation, the fault determination module 62 may increase the fault index for all process variables included in the respective new system matrix.

Figure 4A:
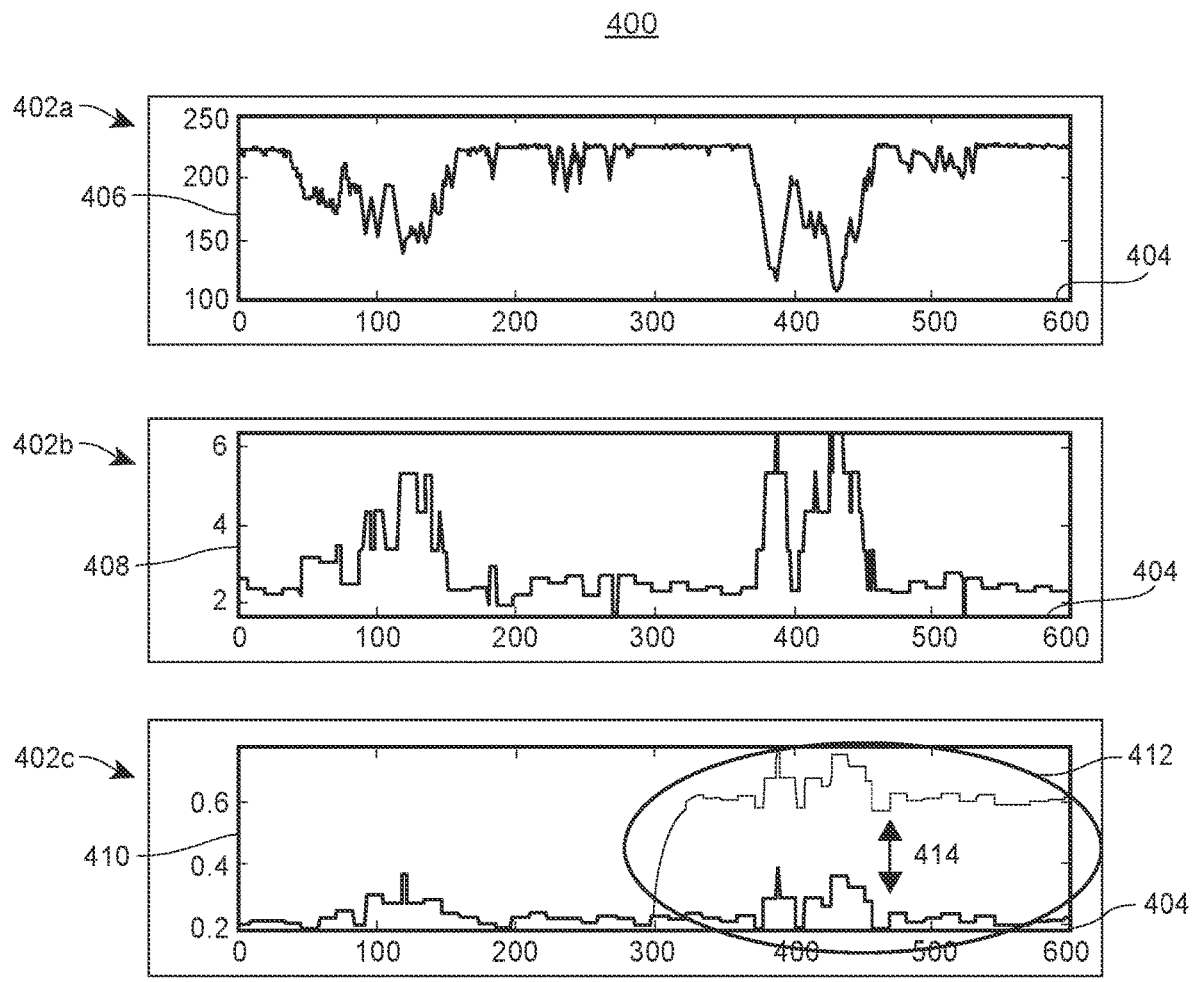
FIG. 4A is a diagram of on-line process variable data including a faulty variable to illustrate portions of the improved faulty variable identification technique of FIG. 3.
Figure 4B:
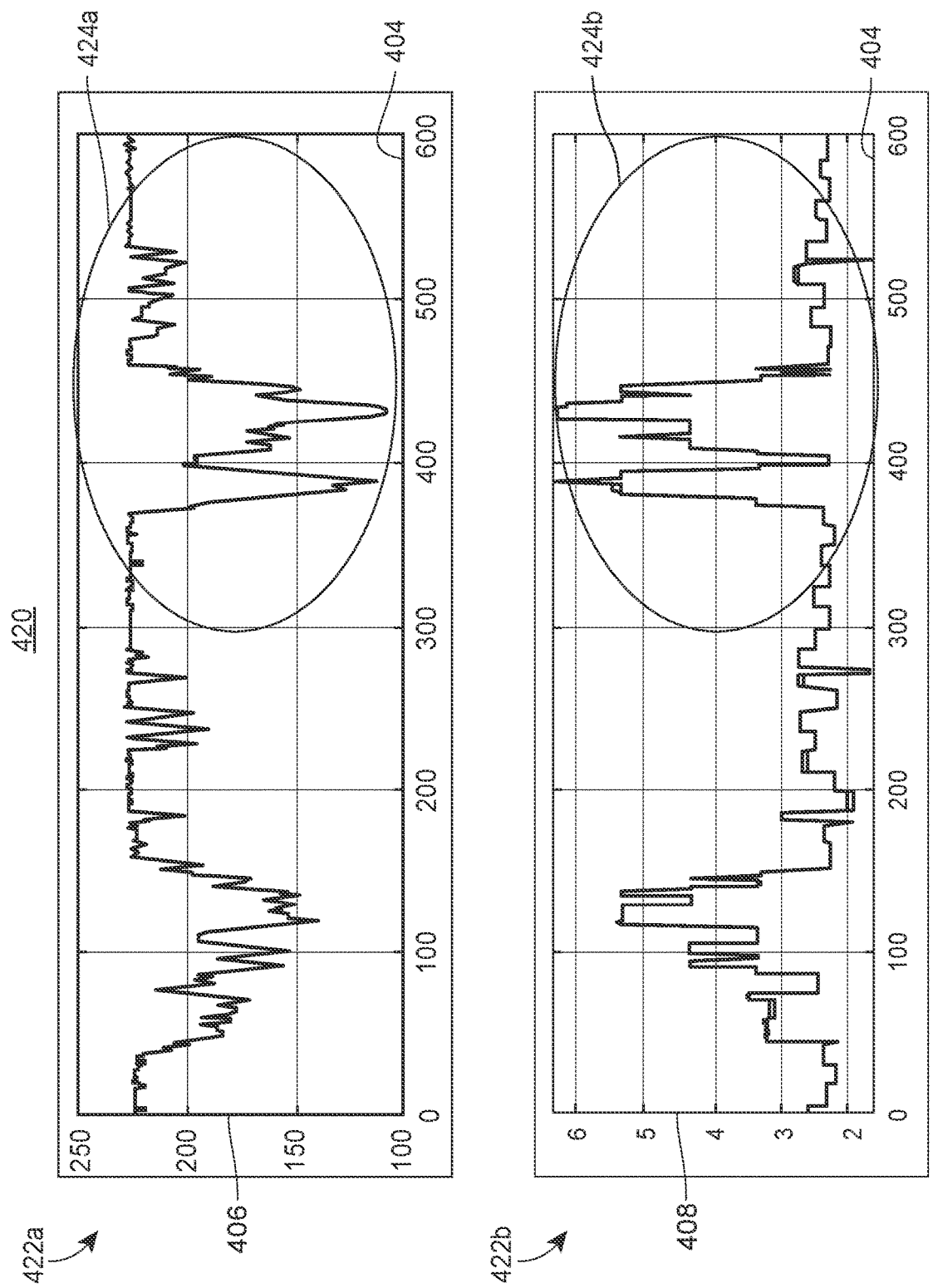
FIG. 4B is a diagram showing estimated process variable data overlaid on on-line process variable data for two "normal" process variables to illustrate portions of the improved training technique of FIG. 3.

Continuing an above example in reference to FIG. 4A, the MSET module 60 may apply the MSET to on-line data three times: once using the new system matrix for load and post-combustion oxygen percentage, once using the new system matrix for load and nitrogen oxides concentration, and once using the new system matrix for post-combustion oxygen percentage and nitrogen oxides concentration. Further, the MSET module 60 may utilize portions of the on-line data illustrated in FIG. 4A for each application of the MSET based on which new system matrix is included in the MSET calculations. Namely, if the MSET module 60 applies the MSET using the new system matrix corresponding to load and post-combustion oxygen percentage, the MSET module 60 may apply the MSET to the process variable data illustrated in the process variable plots 402a and 402b. The results of these calculations are illustrated in the graph 420 of FIG. 4B. The estimated value overlay plots 422a and 422b display the on-line data from the process variable plots 402a and 402b overlaid with the estimated values resulting from the MSET module 60 applying the MSET with the new system matrix of load and post-combustion oxygen percentage to the on-line data from the process variable plots 402a and 402b. As can be seen in the regions of interest 424a and 424b, the estimations are nearly identical to the on-line data and have benefitted from removing the error propagation associated with the nitrogen oxides concentration data. Generally, the estimated values represented in the graph 420 do not exceed the estimation error threshold for either process variable, and as a result, the fault index for the load and the post-combustion oxygen percentage are not increased.

Figure 4C:
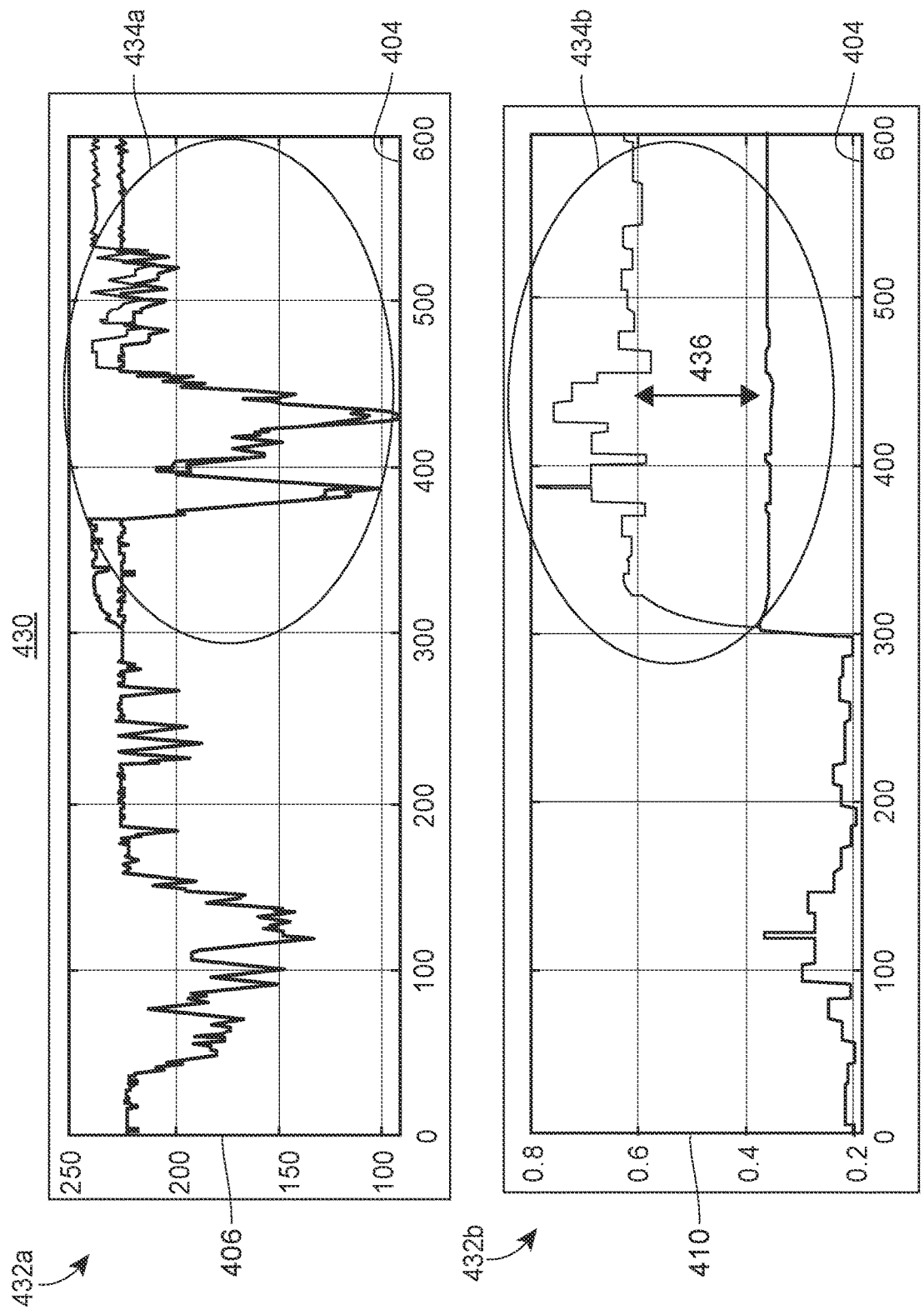
FIG. 4C is a diagram showing estimated process variable data overlaid on on-line process variable data for one "normal" process variable and one faulty variable to illustrate portions of the improved training technique of FIG. 3.

By contrast, consider the graph 430 of FIG. 4C featuring the results of applying the MSET using the new system matrix corresponding to load and nitrogen oxides concentration to the process variable data illustrated in the process variable plots 402a and 402c. The estimated value overlay plot 432a is similar to the estimated value overlay plot 422a, which also shows on-line data and estimated values for the load, but the plots (namely the estimated values) diverge within the regions of interest 424a and 434a due to the propagated error from the erroneous values of the nitrogen oxides concentration, illustrated in the estimated value overlay plot 432b. Within the region of interest 434b, the nitrogen oxides concentration rapidly rises and the estimated values flatten out creating a clear separation 436 between the two values. The relatively flat estimated values curve represents a highest expected value based on the relationship between the nitrogen oxides concentration and the load encapsulated in the new system matrix. In this example, the estimated values represented in the graph 430 exceed the estimation error threshold for both process variables, and as a result, the fault index for the load and the nitrogen oxides concentration are increased by one.

Figure 4D:
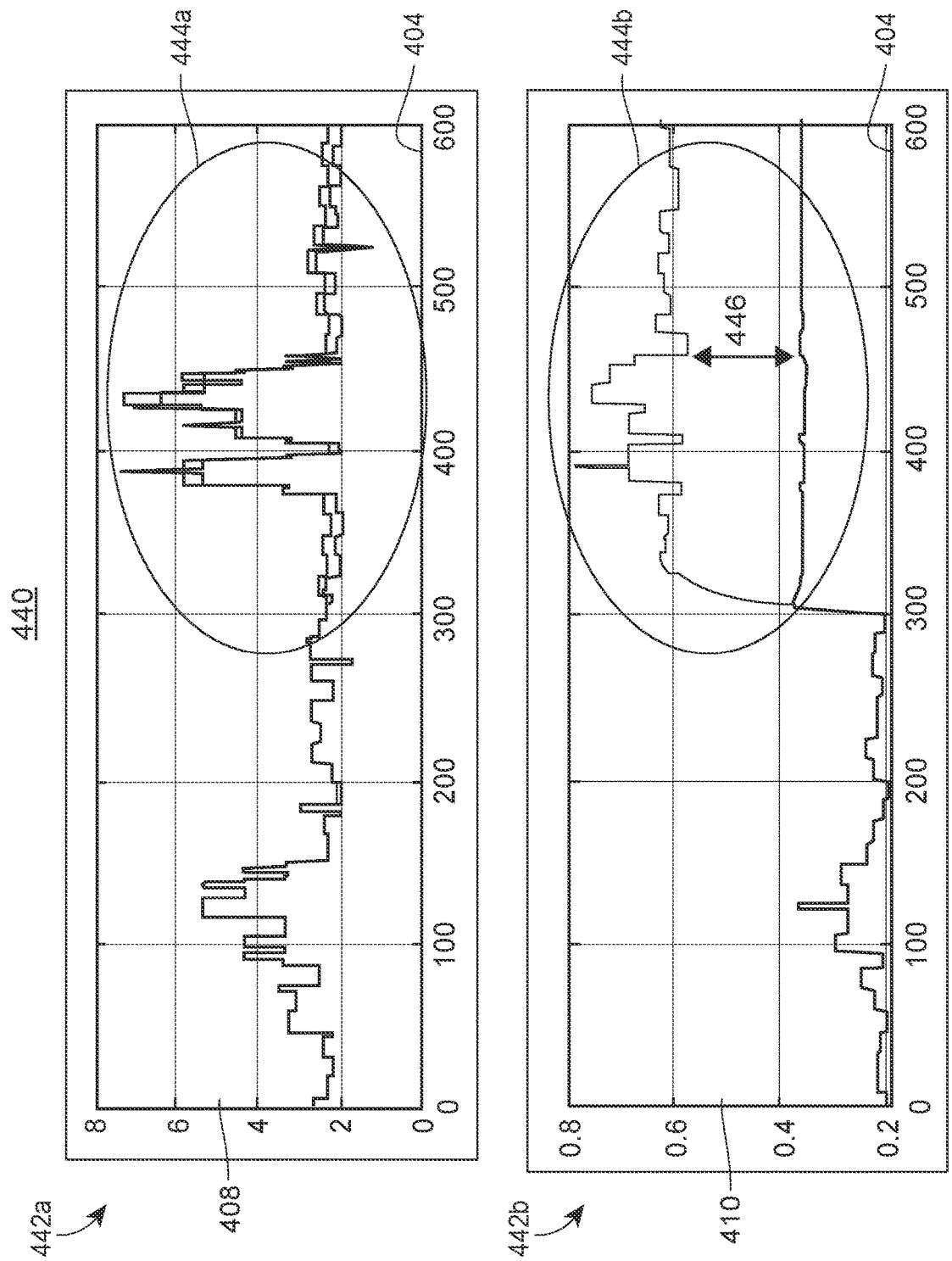
FIG. 4D is another diagram showing estimated process variable data overlaid on on-line process variable data for one "normal" process variable and one faulty variable to illustrate portions of the improved training technique of FIG. 3.

Similarly, consider the graph 440 of FIG. 4D featuring the results of applying the MSET using the new system matrix corresponding to post-combustion oxygen percentage and nitrogen oxides concentration to the process variable data illustrated in the process variable plots 402b and 402c. The estimated value overlay plot 442a is similar to the estimated value overlay plot 422b, which also shows on-line data and estimated values for the post-combustion oxygen percentage, but the plots (namely the estimated values) diverge within the regions of interest 424a and 444a due to the propagated error from the erroneous values of the nitrogen oxides concentration, illustrated in the estimated value overlay plot 442b. Within the region of interest 444b, the nitrogen oxides concentration rapidly rises and the estimated values flatten out creating a clear separation 446 between the two values. The relatively flat estimated values curve represents a highest expected value based on the relationship between the nitrogen oxides concentration and the post-combustion oxygen percentage encapsulated in the new system matrix. In this example, the estimated values represented in the graph 440 exceed the estimation error threshold for both process variables, and as a result, the fault index for the post-combustion oxygen percentage and the nitrogen oxides concentration are increased by one.

The faulty variable identification technique 300 may also determine the faulty variable based on the largest respective fault index (block 314). In reference to the prior example, both the load and the post-combustion oxygen percentage have a fault index of one after all three system matrices are applied using the MSET. The nitrogen oxides concentration has a fault index of two, and therefore has the largest fault index. Accordingly, the fault determination module 62 may determine that the nitrogen oxides concentration is the faulty variable. Of course, in embodiments, the largest respective fault index may be shared by two or more process variables, and the faulty variable identification technique 300 may therefore determine that two or more process variables are faulty variables. In response, the fault determination module 62 also generate and transmit an alert signal A to the user interface 58 to alert an operator of the abnormal operating condition, and more specifically, of the faulty variable causing the abnormal operating conditions. In embodiments, the fault determination module 62 may also transmit the alert signal A to the process controller 54 in order to generate or modify a control signal to control some portion of the process 56 in view of the abnormal operating conditions and the identified faulty variable.

The faulty variable identification technique 300 is an improvement over conventional fault detection methods, at least in part, because the technique 300 increases the accuracy of conventional methods by removing the propagation error experienced when several process variables are evaluated in tandem. In this manner, the technique 300 maximizes system uptime and reduces the costs associated with a sequence stall or equipment damage by providing increased clarity regarding the potential sources of abnormal operating conditions. However, the number of process variables included in a system can be large enough that constructing new matrices and training system matrices for all possible combinations of two process variables can strain system processing resources.

Figure 5:
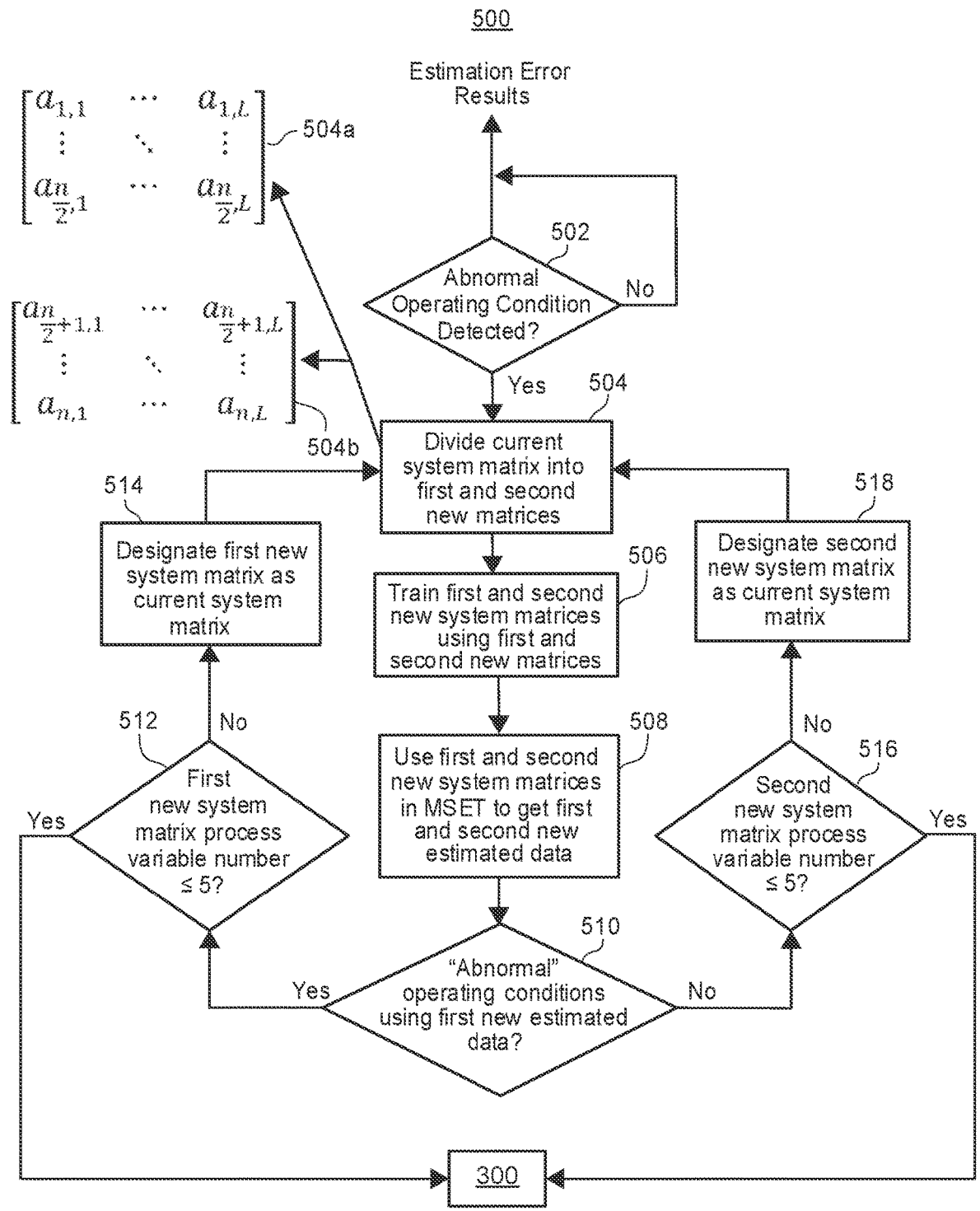
FIG. 5 is a flow diagram of an improved faulty variable location technique that conducts a modified binary search algorithm to locate faulty variables in system matrices as part of a fault detection system to identify faulty variables as a result of fault conditions in the operation of the process plant.

Accordingly, another improved faulty variable location technique 500 that conducts a modified binary search algorithm to locate faulty variables in system matrices as part of a fault detection system to identify faulty variables causing fault conditions in the operation of the process plant is presented in FIG. 5. Generally, the improved faulty variable location technique 500 deconstructs the system matrix (e.g., system matrix 64) into two equally sized (or roughly equally sized) matrices, trains the new matrices to generate two new system matrices, applies the MSET using the new system matrices to on-line data, determines whether one or both new system matrix includes data representative of a faulty variable, and iteratively re-performs these actions until the size of the new system matrix is small enough to perform the improved faulty variable identification technique 300. The fault detection system 52 of FIG. 2 may incorporate and/or perform some or all of the actions described herein with respect to the faulty variable location technique 500.

The faulty variable location technique 500 may start (YES branch of block 502) when the fault determination module 62 determines that at least one estimation error for a process variable in the on-line data exceeds or otherwise fails to satisfy the corresponding estimation error threshold. However, if the estimation error for each process variable satisfies the corresponding estimation error threshold, the faulty variable location technique 500 may not start (NO branch of block 502). For example, the fault determination module 62 may determine that the estimation error for a process variable exceeds or otherwise fails to satisfy the corresponding error threshold using data similar to the data previously discussed with respect to diagram 400 of FIG. 4A.

If the fault determination module 62 identifies an abnormal operating condition, then the module 62 may proceed to divide the current system matrix (e.g., system matrix 64) into a first new matrix 504a and a second new matrix 504b (block 504). As illustrated, the first new matrix 504a may include a first half of the rows of data included in the current system matrix, and the second new matrix 504b may include the remaining rows of data included in the current system matrix. For example, assume that the current system matrix includes ten rows of data, where each row represents data corresponding to a unique process variable. At block 504, the fault determination module 62 may divide the current system matrix so that the first five rows of data (e.g., rows 1-5) populate the first new matrix 504a and the second five rows of data (e.g., rows 6-10) populate the second new matrix 504b. Of course, if the current system matrix includes an odd number of rows of data, the fault determination module 62 may place an additional row of data into either the first new matrix 504a or the second new matrix 504b. Moreover, it is to be appreciated that the faulty variable location technique 500 is an iterative process, so the designation "current" system matrix indicates that the technique 500 has identified abnormal operating conditions (e.g., a faulty variable) within that matrix at a respective iteration of the technique 500.

The faulty variable location technique 500 may also train a first new system matrix and a second new system matrix using the first new matrix and the second new matrix, respectively (block 506). The faulty variable location technique 500 may utilize, for example, the MSET module 60 to apply the system matrix training model 66, which in turn may incorporate any suitable system matrix training technique, as previously discussed. Thereafter, the faulty variable location technique 500 may apply the MSET using the first new system matrix, and again using the second new system matrix, to on-line data to get estimated data consisting of a set of first new estimated data and a set of second new estimated data, respectively (block 508).

Once the MSET module 60 calculates the estimated data, the faulty variable location technique 500 determines whether or not abnormal operating conditions exist within the set of first new estimated data to further determine which new system matrix contains data representative of the faulty variable(s) (block 510). Namely, if the fault determination module 62 calculates an estimation error for each process variable in the set of first new estimated data and determines that each estimated error satisfies the corresponding estimation error threshold (NO branch of block 510), then the fault determination module 62 may determine that the data representative of the faulty variable(s) is contained in the second new system matrix. Accordingly, if the fault determination module 62 calculates an estimation error for each process variable in the set of first new estimated data and determines that at least one estimated error fails to satisfy the corresponding estimation error threshold (YES branch of block 510), then the fault determination module 62 may determine that the data representative of the faulty variable(s) is contained in the first new system matrix. In the event that both the first new system matrix and the second new system matrix contain data representative of at least one faulty variable, the faulty variable location technique 500 may evaluate both new system matrices in parallel or in succession, in accordance with the subsequent actions described herein.

Regardless, when the faulty variable location technique 500 identifies which new system matrix includes data representative of a faulty variable, the technique 500 needs to then determine whether or not the identified new system matrix satisfies a size threshold so that the faulty variable identification technique 300 has sufficient resolution to quickly and efficiently identify the faulty variable(s) within the identified new system matrix. As previously mentioned, the overarching goal of the faulty variable location technique 500 is to determine the location of the data representative of the faulty variable(s) contained within the current system matrix (e.g., system matrix 64) so that the faulty variable identification technique 300 may identify which variable in the on-line data is faulty. However, the faulty variable identification technique 300 requires a threshold resolution to identify faulty variables, which may be generally defined as a system matrix including data representative of at least one faulty variable must have data representative of a corresponding number of normal variables for the technique 300 to identify the faulty variable(s). Accordingly, a more specific goal of the faulty variable location technique 500 is to locate the data representative of the faulty variable(s) within the current system matrix while providing the faulty variable identification technique 300 sufficient resolution to identify the faulty variable(s) within the on-line data.

In reference to a prior example, assume that the system matrix under evaluation by the faulty variable identification technique 300 includes data representative of three process variables, one of which is faulty and two of which are non-faulty. The faulty variable identification technique 300 may generate three new miniature system matrices using each possible unique combination of two of the three process variables, and as a result, the technique 300 has sufficient resolution to identify the faulty process variable because it has a fault index of two, while the two normal process variables each have a fault index of one.

As another example, assume that a system matrix under evaluation by the faulty variable identification technique 300 includes data representative of five process variables: two faulty variables, and three non-faulty variables. The faulty variable identification technique 300 may generate ten new miniature system matrices using each possible unique combination of two of the five process variables. As a result, the faulty variable identification technique 300 has sufficient resolution to identify the two faulty process variables because they both have a fault index of four, while the three non-faulty process variables each have a fault index of two.

As yet another example, assume that a system matrix under evaluation by the faulty variable identification technique 300 includes data representative of three process variables: two faulty variables, and one non-faulty variable. The faulty variable identification technique 300 may generate three new miniature system matrices using each possible unique combination of two of the three process variables. As a result, the faulty variable identification technique 300 does not have sufficient resolution to identify the two faulty process variables because all three process variables have a fault index of three.

Thus, assuming that the faulty variable location technique 500 detects abnormal operating conditions within the on-line data used to generate the first new estimated vectors, the technique 500 may determine whether or not the first new system matrix satisfies the size threshold to provide the faulty variable identification technique 300 sufficient resolution to identify the faulty variable(s) (block 512). As illustrated in block 512 of FIG. 5, the size threshold is five, but it should be understood that the size threshold may be any suitable number greater than or equal to three. If the first new system matrix satisfies the size threshold (e.g., includes data representative of less than or equal to five process variables), then the faulty variable location technique 500 proceeds to utilize the first new system matrix in accordance with the faulty variable identification technique 300 (YES branch of block 512). Alternatively, if the first new system matrix does not satisfy the size threshold (NO branch of block 512), then the faulty variable location technique 500 designates the first new system matrix as the current system matrix (block 514) and returns to block 504.

Of course, the faulty variable location technique 500 may not detect abnormal operating conditions within the on-line data, so the technique 500 may determine whether or not the second new system matrix satisfies the size threshold to provide the faulty variable identification technique 300 sufficient resolution to identify the faulty variable(s) (block 516). If the second new system matrix satisfies the size threshold (e.g., includes data representative of less than or equal to five process variables), then the faulty variable location technique 500 proceeds to utilize the second new system matrix in accordance with the faulty variable identification technique 300 (YES branch of block 516). Alternatively, if the second new system matrix does not satisfy the size threshold (NO branch of block 516), then the faulty variable location technique 500 designates the second new system matrix as the current system matrix (block 518) and returns to block 504.

In this manner, the faulty variable location technique 500 of FIG. 5 may alleviate the processing burdens on the fault detection system 52 resulting from large amounts of process variables included in a system matrix. The faulty variable location technique 500 rapidly eliminates large numbers of process variables from consideration by iteratively halving the system matrix, determining whether one or both halves contain a faulty variable, and eliminating one half from consideration when no faulty variable is located therein. As a result, when the faulty variable identification technique 300 receives the system matrix to identify the faulty variable, the processing resources required to create, train, and utilize the miniature system matrices is substantially reduced.

When implemented, any of the simulation software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A system for identifying faulty variables in on-line data indicative of an on-line operation of a process within a process plant, comprising:
   a process controller coupled to the process for controlling the process; and
   a fault detection system for identifying faulty variables in on-line data received from the process controller, wherein the fault detection system is configured to:
   detect an abnormal operating condition of the process by applying a multivariate state estimation technique (MSET) using a system matrix to the on-line data;
   build a respective new matrix for each unique pair of process variables represented by data included in the system matrix, the data representing measurements of the process variables at distinct moments in time;
   train a respective miniature system matrix for each unique pair of process variables using the respective new matrix;
   define a respective fault index for each process variable included in the system matrix;
   determine estimated data for each unique pair of process variables by applying the MSET using the respective miniature system matrix to a respective portion of the on-line data;
   increment the respective fault index of both process variables included in a unique pair of process variables when an estimation error corresponding to the estimated data for one of the process variables included in the unique pair exceeds a corresponding estimation error threshold; and
   identify a faulty variable by determining a respective process variable with a largest fault index.

2. The system of claim 1, further comprising a user interface communicatively coupled to the process controller and the fault detection system, and wherein the fault detection system is further configured to:
   generate an alert signal indicating the faulty variable; and
   transmit the alert signal to the user interface for viewing by a user.

3. The system of claim 1, wherein the respective new matrix for each unique pair of process variables includes data from the system matrix associated with both respective process variables included in the unique pair of process variables.

4. The system of claim 1, wherein the respective portion of the on-line data used to determine the estimated data for each unique pair of process variables includes on-line data corresponding to both process variables included in the unique pair of process variables.

5. The system of claim 1, wherein the estimation error corresponding to the estimated data is a root-mean-squared (RMS) error, and the corresponding estimation error threshold is a RMS error threshold.

6. The system of claim 1, wherein the largest fault index corresponds to two or more process variables.

7. The system of claim 1, wherein the fault detection system is further configured to:
  (a) divide a current system matrix into a first new matrix and a second new matrix;
  (b) train a first system matrix using the first new matrix;
  (c) train a second system matrix using the second new matrix;
  (d) determine a first estimated data set by applying the MSET using the first system matrix to a respective portion of the on-line data;
  (e) determine whether abnormal operating conditions exist within the respective portion of the on-line data by comparing the first estimated data set to the respective portion of the on-line data;
  (f) responsive to determining that abnormal operating conditions exist within the respective portion of the on-line data:
    determine whether a size of the first system matrix satisfies a size threshold, and
    responsive to determining that the size of the first system matrix does not satisfy the size threshold, designate the first system matrix as the current system matrix;
  (g) responsive to determining that normal operating conditions exist within the respective portion of the on-line data:
    determine whether a size of the second system matrix satisfies the size threshold, and
    responsive to determining that the size of the second system matrix does not satisfy the size threshold, designate the second system matrix as the current system matrix; and
  (h) iteratively perform steps (a)-(h) until the size of the first system matrix or the size of the second system matrix satisfies the size threshold.

8. The system of claim 7, wherein the first new matrix includes data representative of a first portion of the process variables included in the current system matrix, and the second new matrix includes data representative of a second portion of the process variables included in the current system matrix, the second portion being different from the first portion.

9. The system of claim 7, wherein the size of the first system matrix corresponds to a respective number of process variables from the current system matrix represented in the data of the first system matrix, and the size of the second system matrix corresponds to a respective number of process variables from the current system matrix represented in the data of the second system matrix.

10. The system of claim 9, wherein the size threshold is 5 process variables.

11. The method of claim 10, further comprising:
  generating an alert signal indicating the faulty variable; and
  transmitting the alert signal to a user interface for viewing by a user.

12. The method of claim 10, wherein the respective new matrix for each unique pair of process variables includes data from the system matrix associated with both respective process variables included in the unique pair of process variables.

13. The method of claim 10, wherein the respective portion of the on-line data used to determine the estimated data for each unique pair of process variables includes on-line data corresponding to both process variables included in the unique pair of process variables.

14. The method of claim 10, wherein the estimation error corresponding to the estimated data is a root-mean-squared (RMS) error, and the corresponding estimation error threshold is a RMS error threshold.

15. The method of claim 10, wherein the largest fault index corresponds to two or more process variables.

16. The method of claim 10, further comprising:
  (a) dividing a current system matrix into a first new matrix and a second new matrix;
  (b) training a first system matrix using the first new matrix;
  (c) training a second system matrix using the second new matrix;
  (d) determining a first estimated data set by applying the MSET using the first system matrix to a respective portion of the on-line data;
  (e) determining whether abnormal operating conditions exist within the respective portion of the on-line data by comparing the first estimated data set to the respective portion of the on-line data;
  (f) responsive to determining that abnormal operating conditions exist within the respective portion of the on-line data:
    determining whether a size of the first system matrix satisfies a size threshold, and
    responsive to determining that the size of the first system matrix does not satisfy the size threshold, designating the first system matrix as the current system matrix;
  (g) responsive to determining that normal operating conditions exist within the respective portion of the on-line data:
    determining whether a size of the second system matrix satisfies the size threshold, and
    responsive to determining that the size of the second system matrix does not satisfy the size threshold, designating the second system matrix as the current system matrix; and
  (h) iteratively performing steps (a)-(h) until the size of the first system matrix or the size of the second system matrix satisfies the size threshold.

17. The method of claim 16, wherein the first new matrix includes data representative of a first portion of the process variables included in the current system matrix, and the second new matrix includes data representative of a second portion of the process variables included in the current system matrix, the second portion being different from the first portion.

18. The method of claim 16, wherein the size of the first system matrix corresponds to a respective number of process variables from the current system matrix represented in the data of the first system matrix, and the size of the second system matrix corresponds to a respective number of process variables from the current system matrix represented in the data of the second system matrix.

19. A method of identifying faulty variables in on-line data indicative of an on-line operation of a process within a process plant, comprising:
  receiving, from a process controller, the on-line data;
  detecting an abnormal operating condition of the process by applying a multivariate state estimation technique (MSET) using a system matrix to the on-line data;
  building a respective new matrix for each unique pair of process variables represented by data included in the system matrix, the data representing measurements of the process variables at distinct moments in time;

training a respective miniature system matrix for each unique pair of process variables using the respective new matrix;

defining a respective fault index for each process variable included in the system matrix;

determining estimated data for each unique pair of process variables by applying the MSET using the respective miniature system matrix to a respective portion of the on-line data;

incrementing the respective fault index of both process variables included in a unique pair of process variables when an estimation error corresponding to the estimated data for one of the process variables included in the unique pair exceeds a corresponding estimation error threshold; and identifying a faulty variable by determining a respective process variable with a largest fault index.

20. A method of locating faulty variables in on-line data indicative of an on-line operation of a process within a process plant, comprising:

receiving, from a process controller, the on-line data representing measurements of process variables at distinct moments in time;

detecting an abnormal operating condition of the process by applying a multivariate state estimation technique (MSET) using a current system matrix to the on-line data;

(a) dividing the current system matrix into a first new matrix and a second new matrix;

(b) training a first system matrix using the first new matrix;

(c) training a second system matrix using the second new matrix;

(d) determining a first estimated data set by applying the MSET using the first system matrix to a respective portion of the on-line data;

(e) determining whether abnormal operating conditions exist within the respective portion of the on-line data by comparing the first estimated data set to the respective portion of the on-line data;

(f) responsive to determining that abnormal operating conditions exist within the respective portion of the on-line data:

determining whether a size of the first system matrix satisfies a size threshold, and responsive to determining that the size of the first system matrix does not satisfy the size threshold, designating the first system matrix as the current system matrix;

(g) responsive to determining that normal operating conditions exist within the respective portion of the on-line data:

determining whether a size of the second system matrix satisfies the size threshold, and responsive to determining that the size of the second system matrix does not satisfy the size threshold, designating the second system matrix as the current system matrix; and (h) iteratively performing steps (a)-(h) until the size of the first system matrix or the size of the second system matrix satisfies the size threshold.

* * * * *

UNITED STATES PATENT AND TRADEMARK OFFICE
CERTIFICATE OF CORRECTION

| | | |
|---|---|---|
| PATENT NO. | : 11,966,217 B2 | Page 1 of 1 |
| APPLICATION NO. | : 17/132687 | |
| DATED | : April 23, 2024 | |
| INVENTOR(S) | : Xu Cheng | |

It is certified that error appears in the above-identified patent and that said Letters Patent is hereby corrected as shown below:

In the Specification

At Column 13, Line 30, "exchanges," should be -- exchangers, --.

At Column 18, Line 1, "est to" should be -- to --.

In the Claims

At Column 25, Line 56, "method of claim" should be -- system of claim --.

At Column 25, Line 61, "method of claim" should be -- system of claim --.

At Column 25, Line 66, "method of claim" should be -- system of claim --.

At Column 26, Line 4, "method of claim" should be -- system of claim --.

At Column 26, Line 8, "method of claim" should be -- system of claim --.

At Column 26, Line 10, "method of claim" should be -- system of claim --.

At Column 26, Line 45, "method of claim" should be -- system of claim --.

At Column 26, Line 52, "method of claim" should be -- system of claim --.

Signed and Sealed this
Third Day of February, 2026

John A. Squires
*Director of the United States Patent and Trademark Office*